United States Patent
Liu

(10) Patent No.: US 9,828,248 B2
(45) Date of Patent: Nov. 28, 2017

(54) VARIABLE-DENSITY CARBON NANOTUBE FILM

(71) Applicant: Beijing FUNATE Innovation Technology Co., LTD., Beijing (CN)

(72) Inventor: Liang Liu, Beijing (CN)

(73) Assignee: Beijing FUNATE Innovation Technology Co., LTD., Beijing (CN)

( * ) Notice: Subject to any disclaimer, the term of this patent is extended or adjusted under 35 U.S.C. 154(b) by 399 days.

(21) Appl. No.: 14/559,253

(22) Filed: Dec. 3, 2014

(65) Prior Publication Data

US 2015/0140264 A1    May 21, 2015

Related U.S. Application Data

(63) Continuation of application No. 12/884,663, filed on Sep. 17, 2010, now Pat. No. 8,962,090.

(30) Foreign Application Priority Data

Dec. 3, 2009  (CN) .......................... 2009 1 0250040

(51) Int. Cl.
| | |
|---|---|
| *C01B 31/02* | (2006.01) |
| *B82Y 30/00* | (2011.01) |
| *B82Y 40/00* | (2011.01) |
| *C01B 32/15* | (2017.01) |
| *C01B 32/158* | (2017.01) |

(52) U.S. Cl.
CPC ............ *C01B 31/022* (2013.01); *B82Y 30/00* (2013.01); *B82Y 40/00* (2013.01); *C01B 32/15* (2017.08); *C01B 32/158* (2017.08); *C01B 2202/08* (2013.01); *Y10S 977/742* (2013.01); *Y10S 977/902* (2013.01); *Y10T 428/2457* (2015.01); *Y10T 428/24273* (2015.01); *Y10T 428/24603* (2015.01); *Y10T 428/24893* (2015.01)

(58) Field of Classification Search
CPC .................................................. C01B 2202/08
See application file for complete search history.

(56) References Cited

U.S. PATENT DOCUMENTS

| | | | | |
|---|---|---|---|---|
| 2009/0169819 | A1* | 7/2009 | Drzaic .................. | B82Y 30/00 428/156 |
| 2009/0289203 | A1* | 11/2009 | Jiang ................... | B81C 99/0095 250/492.1 |
| 2010/0270911 | A1* | 10/2010 | Liu ........................ | B82Y 30/00 313/503 |

* cited by examiner

Primary Examiner — Ian Rummel
(74) Attorney, Agent, or Firm — Steven Reiss

(57) ABSTRACT

A method for making a variable-density carbon nanotube film is provided. A drawn carbon nanotube film, including a number of carbon nanotubes aligned along an aligned direction, is prepared. A number of thin regions are formed in the drawn carbon nanotube film along the aligned direction by reducing density of carbon nanotubes in each of the plurality of thin regions. A variable-density carbon nanotube film is provided and includes a number of thin regions and at least one normal region having a density of carbon nanotubes greater than that of the thin regions. The at least one normal region includes a number of carbon nanotubes substantially aligned along an aligned direction. The thin regions are arranged in the form of at least one row extending along the aligned direction.

10 Claims, 11 Drawing Sheets

VARIABLE-DENSITY CARBON NANOTUBE FILM

CROSS-REFERENCE TO RELATED APPLICATIONS

This application is a continuation application of U.S. patent application Ser. No. 12/884,663, filed Sep. 17, 2010, entitled, "VARIABLE-DENSITY CARBON NANOTUBE FILM AND METHOD FOR MANUFACTURING THE SAME", which claims all benefits accruing under 35 U.S.C. §119 from China Patent Application No. 200910250040.0, filed on Dec. 3, 2009, in the China Intellectual Property Office, the contents of which are hereby incorporated by reference.

FIELD

The present disclosure relates to variable-density carbon nanotube films and methods for manufacturing the same, and particularly to a variable-density carbon nanotube film having high light transmittance.

BACKGROUND

Carbon nanotubes (CNTs) are a novel carbonaceous material and have received a great deal of interest since the early 1990s. Carbon nanotubes have interesting and potentially useful electrical and mechanical properties. Due to these and other properties, CNTs have become an important new material for use in a variety of fields. However, the acquired CNTs are generally in a form of particles or powder and that is inconvenient for applications. So it is necessary to make carbon nanotube film.

Nowadays, methods for making carbon nanotube film include, using chemical vapor deposition (CVD) to grow a carbon nanotube film by dissolving carbon nanotube powder into a solvent to form a solution, coating the solution onto a surface of a substrate, and drying the solution thereon to form a carbon nanotube film. There is also the Langmuir Blodgett (LB) method, which involves mixing the carbon nanotube solution with another solution having a different density, causing the carbon nanotubes to float on the surface of the solution to form a carbon nanotube film. The carbon nanotube film acquired by the LB method is a uniform net structure and the carbon nanotubes in the carbon nanotube film are dispersed uniformly and without agglomeration. However, the carbon nanotubes in the carbon nanotube film are disordered and not conducive to exploitation.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
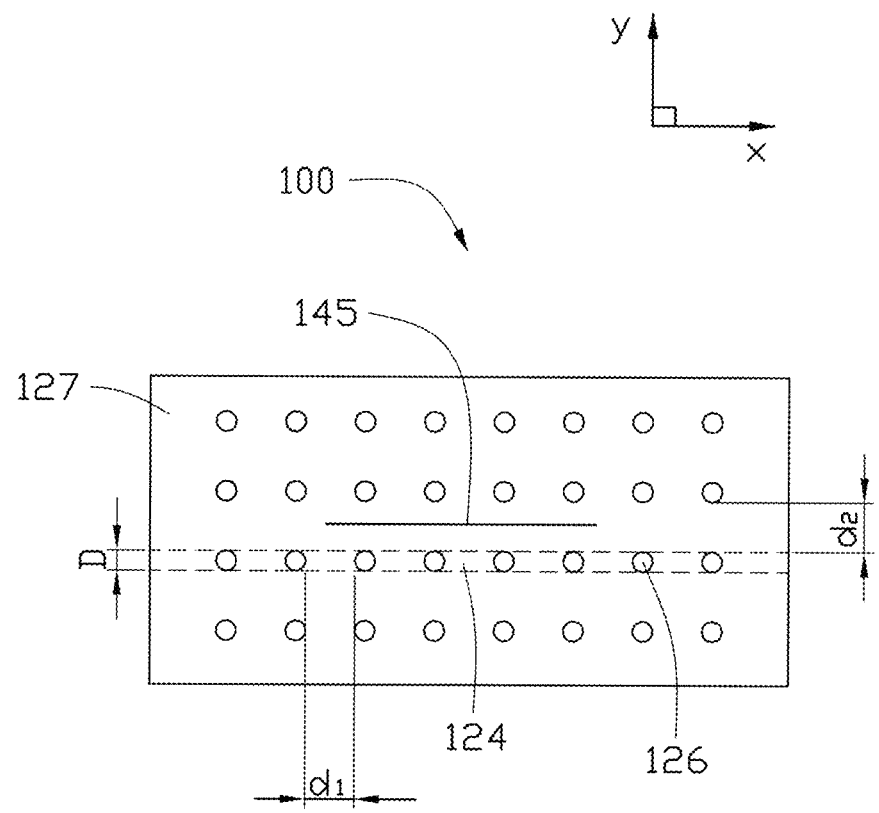
FIG. 1 shows a top view of one embodiment of a variable-density carbon nanotube film having a plurality of spaced thin regions.

Referring to FIG. 1, one embodiment of a variable-density carbon nanotube film 100 includes a number of successively oriented carbon nanotubes joined end-to-end by Van der Waals attractive force. The carbon nanotubes in the variable-density carbon nanotube film 100 can be substantially aligned in the first direction X as shown in FIG. 1. More specifically, the variable-density carbon nanotube film 100 includes a plurality of successively oriented carbon nanotube segments joined end-to-end by Van der Waals attractive force therebetween. Each carbon nanotube segment includes a plurality of carbon nanotubes 145 substantially parallel to each other, and joined by Van der Waals attractive force therebetween.

Figure 2:
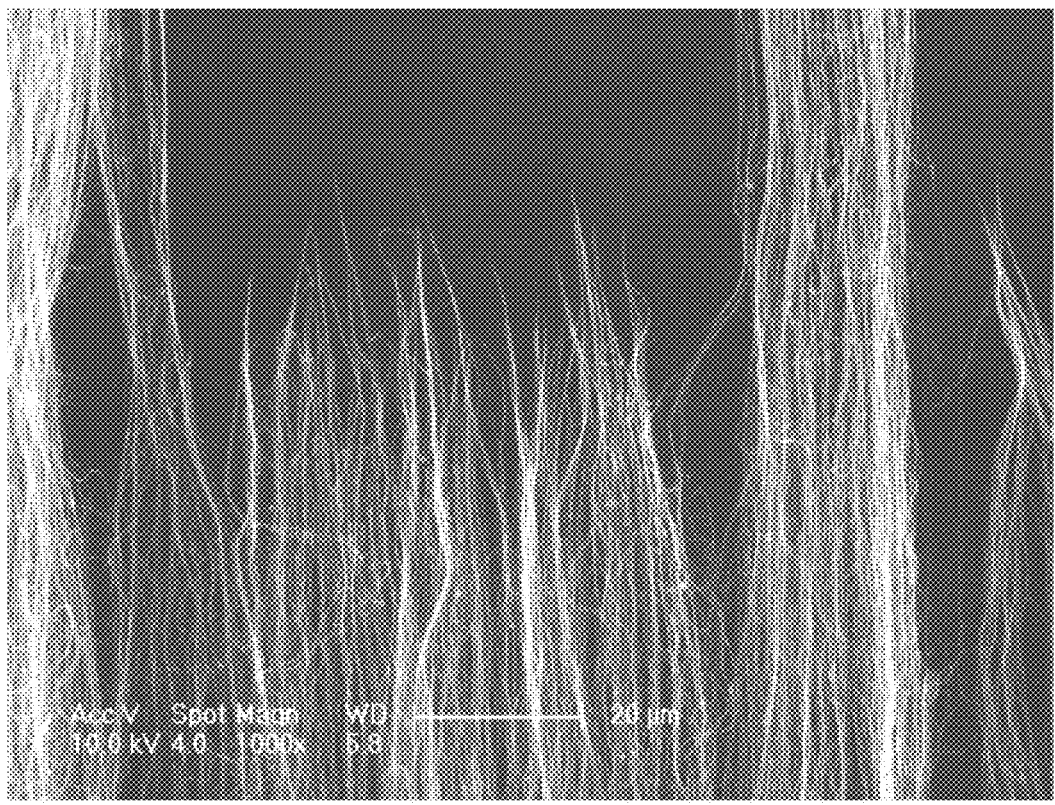
FIG. 2 is a Scanning Electron Microscope (SEM) image of an embodiment one of a thin region.

The variable-density carbon nanotube film 100 can be divided into a number of thin regions 126 and a normal region 127. Also referring to FIG. 2, the thin regions 126 have a density of carbon nanotubes less than that of the normal region 127. In one embodiment, the density of the thin regions 126 can range from about 0% to about 80% of the density of the normal region 127. In one embodiment, the density of the thin regions 126 can range from about 0% to about 50% of the density of the normal region 127. If the density of the thin regions 126 is 0% of the density of the normal region 127, the thin regions 126 can be openings such as holes and slots defined through the variable-density carbon nanotube film 100.

The thin regions 126 can be spaced arranged in the normal region 127 in the form of a number of rows 124 extending along the first direction X. In each of the rows 124, the thin regions 126 can be spaced from adjacent ones by a distance $d_1$. The distance $d_1$ can be less than 100 micrometers. The rows 124 are spaced from one another a distance $d_2$ in the second direction Y as shown in FIG. 1. The distance $d_2$ can be greater than the distance $d_1$. The distance $d_2$ can range from about 1 micrometer to about 5 millimeters (e.g. from about 10 micrometers to about 100 micrometers). The distance $d_2$ between adjacent rows 124 can be the same or different.

The shape of the thin regions 126 is not limited, and can be round or other shapes according to actual applications. If the shape of the thin regions 126 is round, the diameter D of the thin regions 126 can range from about 1 micrometer to about 5 millimeters (e.g. from about 10 micrometers to about 100 micrometers). Further, the number of the thin regions 126 in each row 124 can be substantially same.

In the embodiment shown in FIG. 1, the rows 124 can be arranged substantially parallel in the normal region 127 at uniform intervals along the second direction Y. The distance $d_2$ can be about 20 micrometers. The thin regions 126 are round, and the diameter D of the thin regions 126 can be about 20 micrometers. The thin regions 126 in each of the rows 124 align with corresponding thin regions 126 in adjacent rows 124 to form a number of columns in the second direction Y. Alternatively, as shown in FIG. 3, the thin regions 126 of every two adjacent rows 124 can be arranged in staggered formation.

Figure 3:
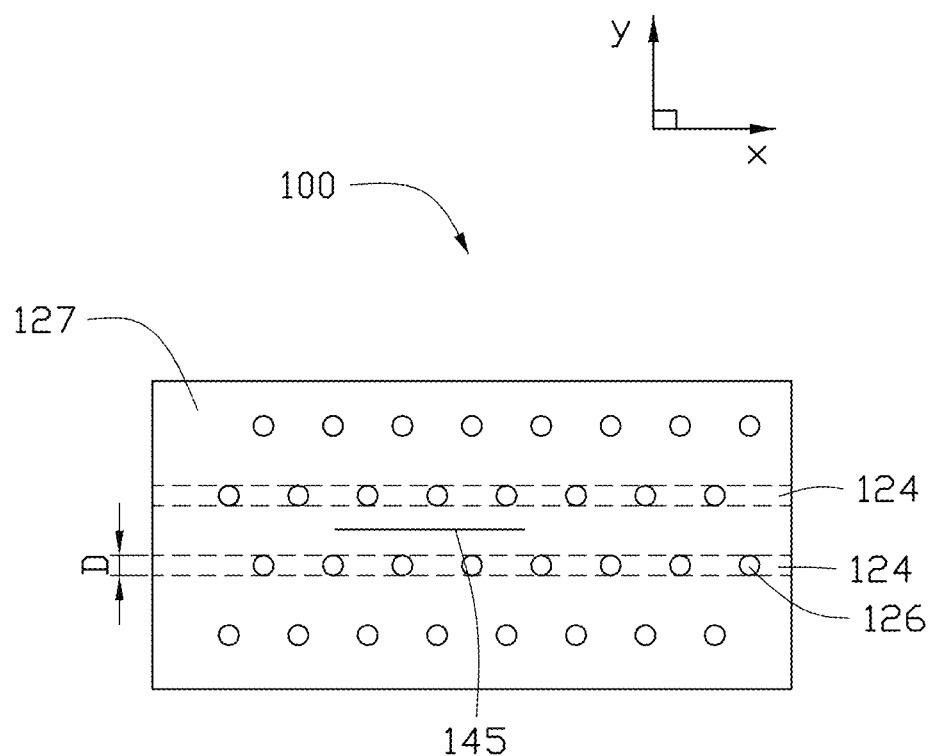
FIG. 3 is similar to FIG. 1, except that thin regions of every two adjacent rows are arranged in staggered formation.

As shown in FIG. 1 and FIG. 3, there are carbon nanotubes 145 between every two adjacent rows 124 that are joined end-to-end. The carbon nanotubes 145 between the every two adjacent rows 124 can define at least one continuous electrically conductive path along the first direction X. Thus, the electrical conductivity of the variable-density carbon nanotube film 100 in the first direction X will not be affected greatly by the presence of the thin regions 126. However, the presence of the thin regions 126 greatly reduces the electrical conductivity of the variable-density carbon nanotube film 100 in the second direction Y, because there are less carbon nanotubes electrically connected in the second direction Y and because the carbon nanotubes are substantially aligned in the first direction X. In other words, the presence of the thin regions 126 can increase the difference in the electrical conductivity of the variable-density carbon nanotube film 100 between the first direction X and the second direction Y.

As described above, because the thin regions 126 have a density less than that of the normal region 127, the light transmittance of the thin regions 126 can be about 10% to about 20% greater than that of the normal region 127 if the density of the thin regions 126 ranges from about 0% to about 50% of the density of the normal region 127. If the thin regions 126 are in the form of holes or openings, the light transmittance of the thin regions 126 can be much greater than that of the normal region 127. Thus, the light transmittance of the whole variable-density carbon nanotube film 100 can be improved.

Figure 4:
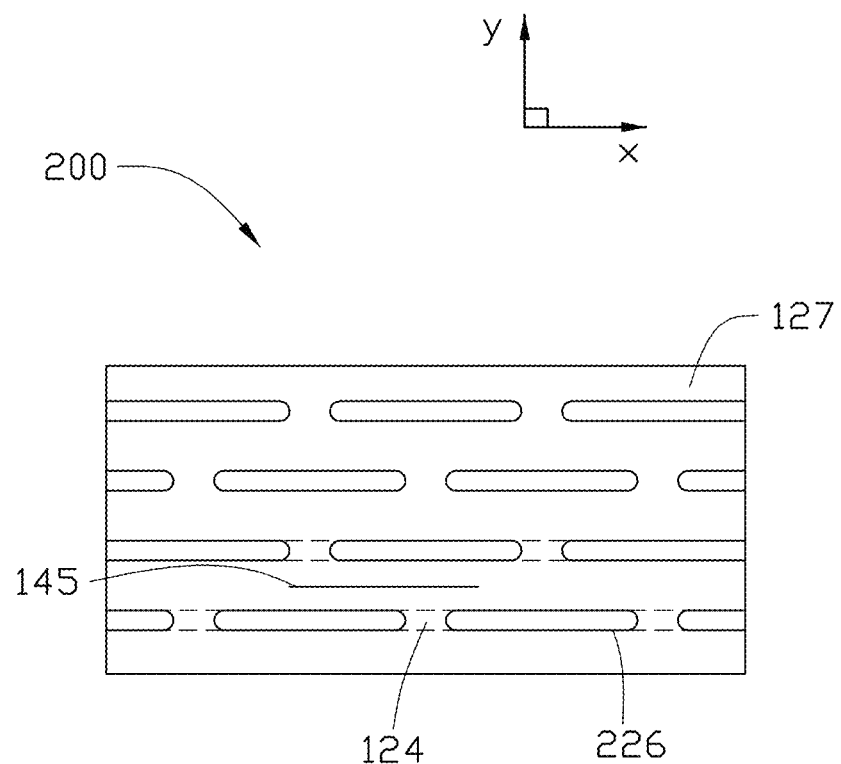
FIG. 4 is similar to FIG. 1, except that thin regions each have a strip shape.

Referring to FIG. 4, one embodiment of a variable-density carbon nanotube film 200 is shown. The variable-density carbon nanotube film 200 is similar to the variable-density carbon nanotube film 100 except that the thin regions 226 each have a strip shape. In each rows 124, a number of spaced thin regions 226 are arranged. Each of the thin regions 226 has a lengthwise direction which is substantially parallel to the first direction X. The length of the thin region 226 is greater than the width of the thin region 226. The width of the thin region 226 can range from about 1 micrometer to about 5 millimeters (e.g. from about 10 micrometers to about 100 micrometers).

Figure 5:
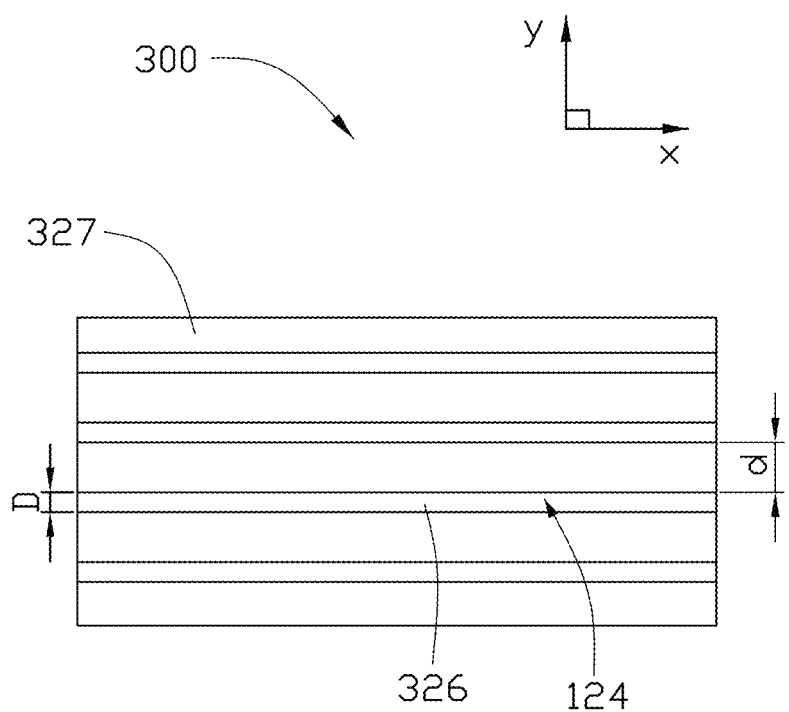
FIG. 5 is similar to FIG. 4, except that thin regions each extend across the entire variable-density carbon nanotube film.

Referring to FIG. 5, one embodiment of a variable-density carbon nanotube film 300 is shown. The variable-density carbon nanotube film 300 is similar to the variable-density carbon nanotube film 200 except that each row 124 is a thin region 326 which has a long strip shape and extends across the entire variable-density carbon nanotube film 300 along the first direction X. Because each of the thin regions 326 extends across the entire variable-density carbon nanotube film 300 along the first direction X, a number of normal regions 327 are defined between adjacent thin regions 326.

The thin regions 326 and the normal regions 327 are alternatively arranged along the second direction Y. In the embodiment shown in FIG. 5, the electrical conductivity of the variable-density carbon nanotube film 300 in the second direction Y can be further reduced. Thus, the difference in the electrical conductivity of the variable-density carbon nanotube film 300 in the first direction X and the second direction Y can be further increased.

Figure 6:
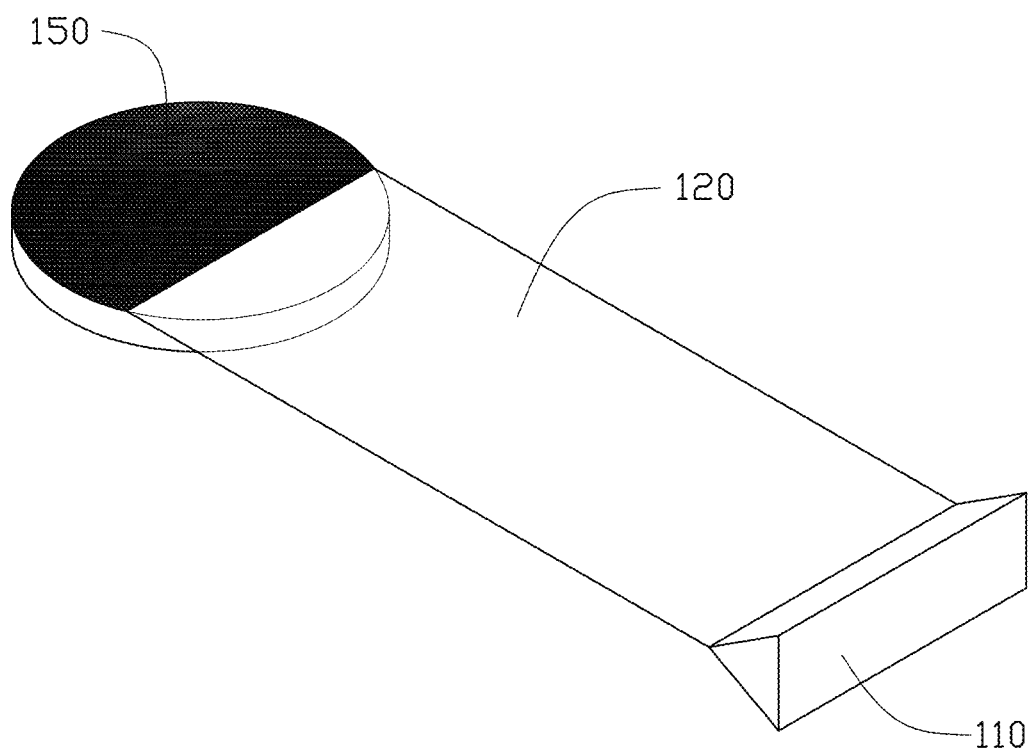
FIG. 6 is a schematic structural view of one embodiment of a process of fabricating a drawn carbon nanotube film.

One embodiment of a method for fabricating the above described variable-density carbon nanotube films 100/200/300 includes the steps of:
  (a) providing a drawn carbon nanotube film 120 comprising of a number of carbon nanotubes aligned along a same direction (FIG. 6); in some embodiments, the carbon nanotube film 120 consisted of carbon nanotubes; and
  (b) forming a number of thin regions 126/226/326 in the drawn carbon nanotube film 120 along the aligned direction of the carbon nanotubes.

In step (a), the drawn carbon nanotube film 120 can be formed by drawing a film from a carbon nanotube array 150 capable of having a film drawn therefrom. The drawn carbon nanotube film 120 can be fabricated according to the following steps of:
  (a-1) providing a carbon nanotube array 150; and
  (a-2) drawing a drawn carbon nanotube film 120 from the carbon nanotube array 150.

In step (a-1), the carbon nanotube array 150 can be a super-aligned array of carbon nanotubes, which can be formed by chemical vapor deposition method or other methods. Examples of a method for fabricating a super-aligned array of carbon nanotubes are taught by US PGPub. 20080248235A1 to Feng et al. Carbon nanotubes of the carbon nanotube array 150 can be substantially parallel to each other. The carbon nanotubes can be selected from single-walled, double-walled, and/or multi-walled carbon nanotubes. Diameters of the carbon nanotubes can range from about 1 nanometer to about 50 nanometers. Lengths of the carbon nanotubes can range from about 50 nanometers to about 5 millimeters. In one embodiment, the lengths of the carbon nanotubes can range from about 100 micrometers to about 900 micrometers.

Step (a-2) includes the sub-steps of:
  (a-21) selecting a plurality of carbon nanotube segments having a predetermined width from the carbon nanotube array 150; and
  (a-22) pulling the carbon nanotube segments at an even/uniform speed to form the continuous drawn carbon nanotube film 120.

In step (a-21), the carbon nanotube segments having a predetermined width, can be selected by using an adhesive tape as a tool 110 to contact the carbon nanotube array 150. In step (a-22), the pulling direction is substantially perpendicular to the growing direction of the carbon nanotube array 150. During the pulling process, as the initial carbon nanotube segments are drawn out, other carbon nanotube segments are also drawn out end to end, due to the Van der Waals attractive force between the ends of adjacent segments. The drawn carbon nanotube film 120 produced in such manner can be selectively formed having a predetermined width.

Figure 7:
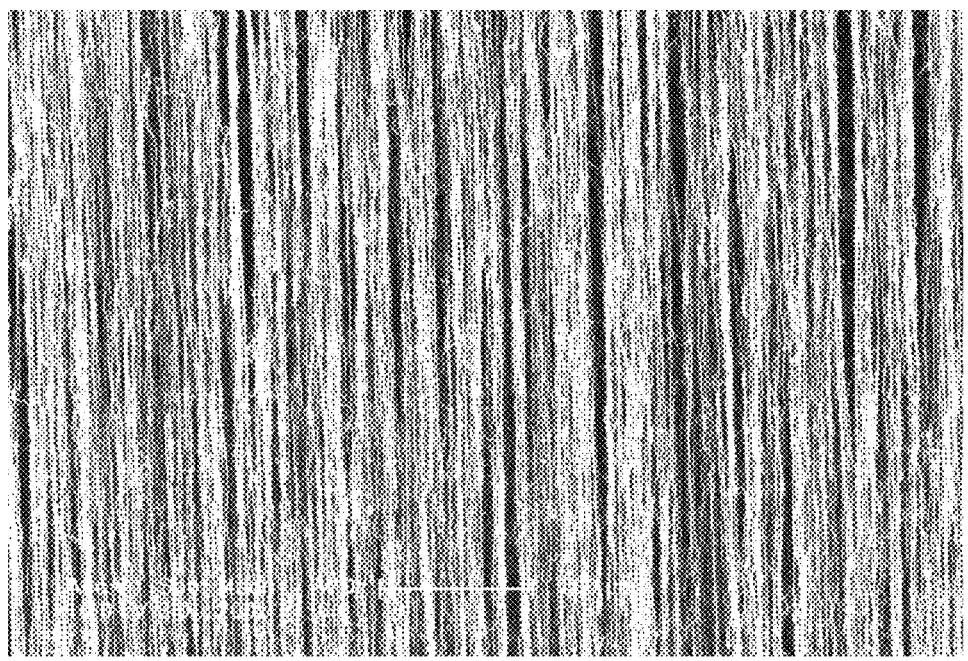
FIG. 7 shows an SEM image of the drawn carbon nanotube film.

Referring to FIG. 7, the drawn carbon nanotube film 120 includes a plurality of carbon nanotubes that can be arranged substantially parallel to a surface of the drawn carbon nanotube film 120. A large number of the carbon nanotubes in the drawn carbon nanotube film 120 can be oriented along a preferred orientation, meaning that a large number of the carbon nanotubes in the drawn carbon nanotube film 120 are arranged substantially along the same direction. An end of one carbon nanotube is joined to another end of an adjacent carbon nanotube arranged substantially along the same direction, by Van der Waals attractive force. A small number of the carbon nanotubes are randomly arranged in the drawn carbon nanotube film 120, and has a small if not negligible effect on the larger number of the carbon nanotubes in the drawn carbon nanotube film 120 arranged substantially along the same direction. The drawn carbon nanotube film 120 is capable of forming a free-standing structure. The term "free-standing structure" can be defined as a structure that does not have to be supported by a substrate. For example, a free standing structure can sustain its weight when hoisted by a portion thereof without any significant damage to its structural integrity. So, if the drawn carbon nanotube film 120 is placed between two separate supporters, a portion of the drawn carbon nanotube film 120, not in contact with the two supporters, would be suspended between the two supporters and yet maintain film structural integrity. The free-standing structure of the drawn carbon nanotube film 120 is realized by the successive carbon nanotubes joined end to end by Van der Waals attractive force.

It can be appreciated that some variation can occur in the orientation of the carbon nanotubes in the drawn carbon nanotube film 120 as can be seen in FIG. 7. Microscopically, the carbon nanotubes oriented substantially along the same direction may not be perfectly aligned in a straight line, and some curve portions may exist. It can be understood that some carbon nanotubes located substantially side by side and oriented along the same direction being contact with each other can not be excluded.

Figure 8:
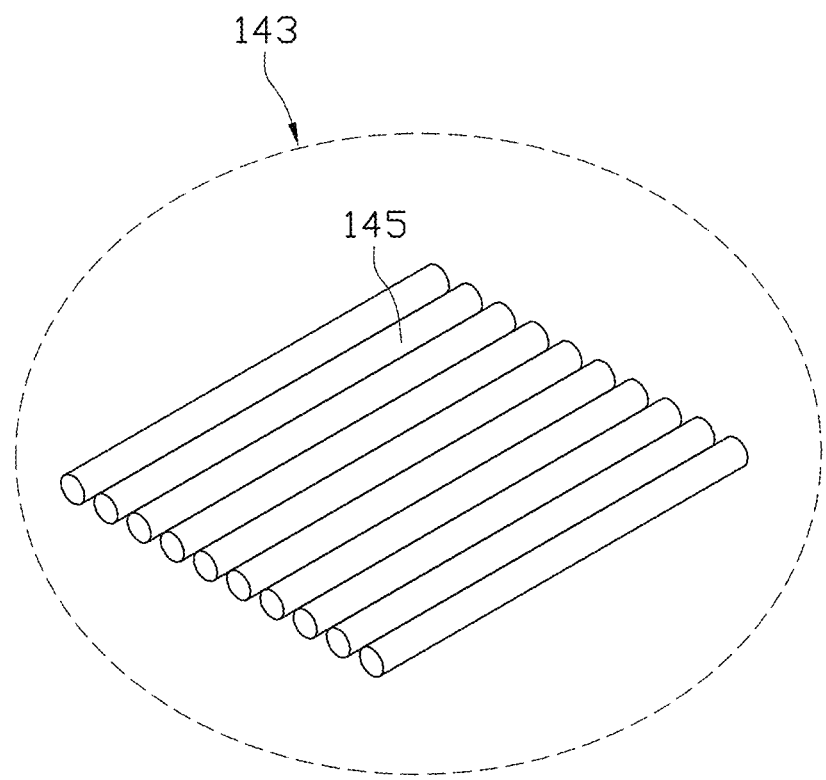
FIG. 8 is a schematic view of a carbon nanotube segment.
Figure 9:
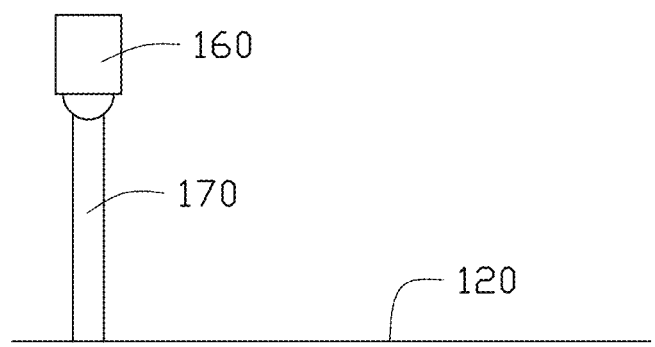
FIG. 9 is a schematic structural view of one embodiment of a method for fabricating a variable-density carbon nanotube film via laser.

More specifically, referring to FIG. 8, the drawn carbon nanotube film 120 includes a plurality of successively oriented carbon nanotube segments 143 joined end-to-end by Van der Waals attractive force therebetween. Each carbon nanotube segment 143 includes a plurality of carbon nanotubes 145 substantially parallel to each other, and joined by Van der Waals attractive force therebetween. The carbon nanotube segments 143 can vary in width, thickness, uniformity and shape. The carbon nanotubes 145 in the carbon nanotube segments 143 are also substantially oriented along a preferred orientation.

Figure 10:
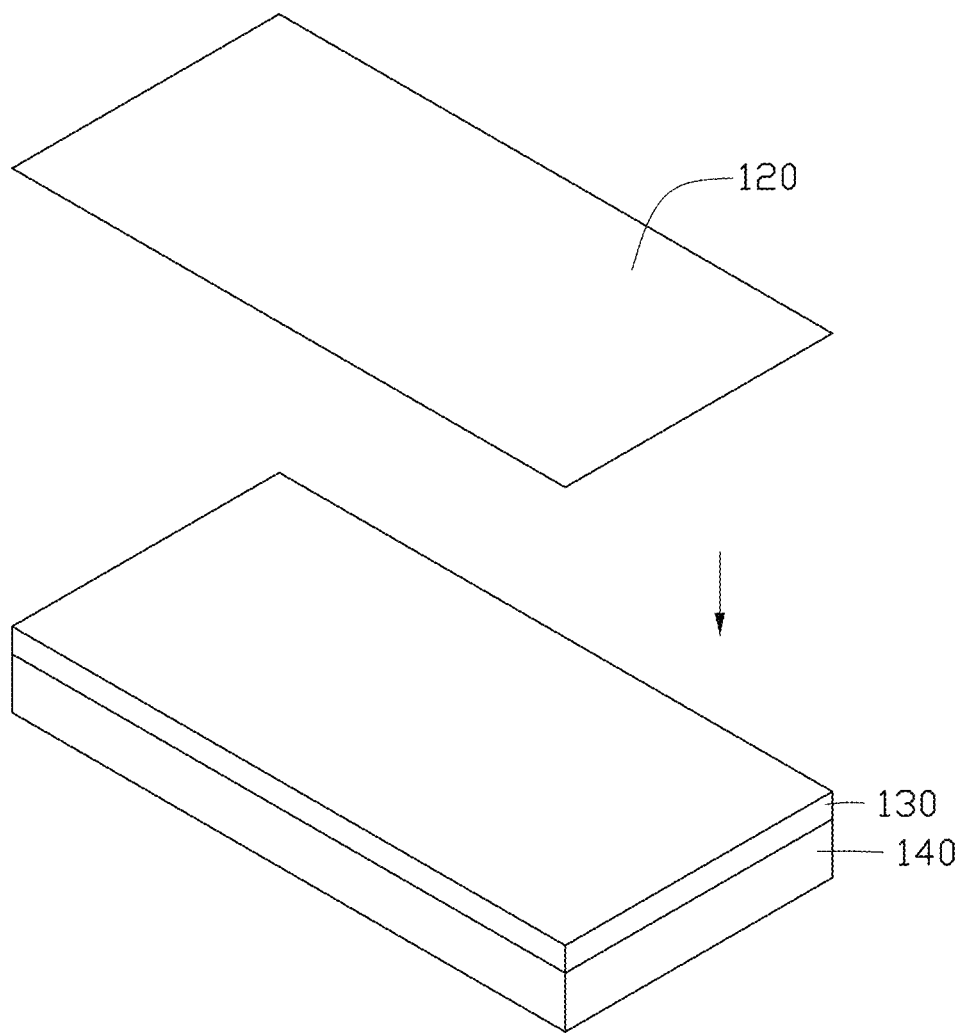
FIG. 10 is a schematic drawing that illustrates one embodiment of a process of putting the drawn carbon nanotube film on a substrate.

Referring to FIG. 10, in one embodiment, step (a) can further include a step of putting the drawn carbon nanotube film 120 on a substrate 140 after the step (a-2). Because the carbon nanotubes in the super-aligned array of carbon nanotubes have a high purity and a high specific surface area, the drawn carbon nanotube film 120 can be adhesive. As such, the drawn carbon nanotube film 120 can be adhered to the surface of the substrate 140 directly, in some embodiments.

Further, the substrate 140 can be transparent or opaque. The substrate 140 can be made of glass, quartz, plastic or resin. In one embodiment, the substrate 140 can be made of polyethylene terephthalate (PET). In one embodiment, a layer of adhesives 130 can be coated on one surface of the substrate 140 to secure the drawn carbon nanotube film 120 on the substrate 140. The layer of adhesives 130 can be pressure sensitive adhesives, thermo-sensitive adhesives, or photosensitive adhesive. In one embodiment, the layer of adhesives 130 can comprise butyl acrylate, 2-ethylhexyl acrylate, vinyl acetate, glycidyl methacrylate, acrylic acid, benzoperoxide, or a mixture of toluol and ethyl acetate.

As described above, the drawn carbon nanotube film 120 can be formed by step (a). However, the light transmittance of the drawn carbon nanotube film 120 is low, usually below 75%. The drawn carbon nanotube film 120 produced in such manner tends to have a number of large size or thickness carbon nanotube segments. This may be because, in step (a-21) the carbon nanotube segments are selected by using an adhesive tape to contact the carbon nanotube array 150, and it is difficult to control the size or thickness of the carbon nanotube segments which would be drawn out. As a result, the drawn carbon nanotube film 120 is formed by a plurality of carbon nanotube segments which have different sizes or thickness and are joined end-to-end. The large-diameter or size carbon nanotube segments may be the reasons why the light transmittance of the drawn carbon nanotube film 120 is low. The light transmittance of the drawn carbon nanotube film 120 can be improved through step (b).

Step (b) includes the sub-steps of:

(b-1) providing a laser device 160, which is used to produce a laser beam 170 irradiating on the drawn carbon nanotube film 120; and (b-2) forming the thin regions 126/226/326 in the drawn carbon nanotube film 120 by irradiating the drawn carbon nanotube film 120 with the laser beam 170 generated by the laser device 160.

In step (b-1), the laser device 160 can be an argon ion laser or a carbon dioxide laser. In one embodiment, the laser device 160 can have a power of approximately 12 watts. The laser beam 170 can be a pulse laser having a power of approximately 1 to 100 watts.

Figure 11:
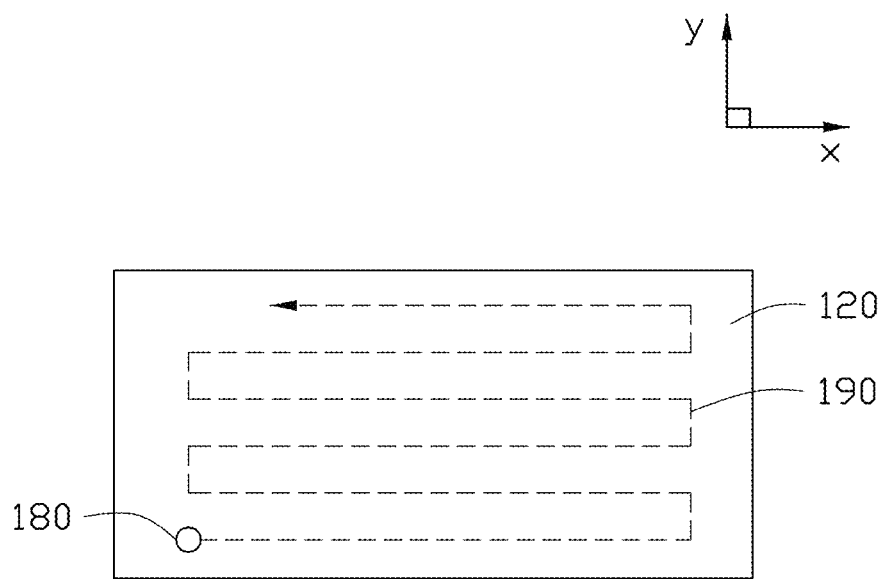
FIG. 11 shows a path of a laser spot on the drawn carbon nanotube film.

Referring to FIG. 11, if the laser beam 170 is irradiated on the drawn carbon nanotube film 120, a laser spot 180 can be formed on the drawn carbon nanotube film 120. The laser spot 180 can be round in shape and have a diameter ranging from about 1 micrometer to about 5 millimeters (e.g. about 20 micrometers). It is noteworthy that the laser beam 170 can be focused by a lens. It is also noteworthy that a number of laser devices can be adopted to adjust the shape of the laser spot 180. In one embodiment, the laser spot 180 can have a strip shape having a width ranging from about 1 micrometer to about 5 millimeters (about 20 micrometers).

In step (b-2), the drawn carbon nanotube film 120 and/or the laser beam 170 are controlled to move relative to each other so that the laser spot 180 moves relative to the drawn carbon nanotube film 120 along the first direction X to form the thin regions 126/226/326 in the drawn carbon nanotube film 120 along the first direction X.

In one embodiment, the drawn carbon nanotube film 120 can be fixed, and the laser device 160 can be moved to irradiate selected portions of the drawn carbon nanotube film 120. In another embodiment, the laser beam 170 can be fixed, and the drawn carbon nanotube film 120 can be moved relative to the laser beam 170 so that selected portions of the drawn carbon nanotube film 120 can be irradiated by the laser beam 170. In one embodiment, the drawn carbon nanotube film 120 and the laser device 160 can be fixed, the emergence angle of the laser beam 170 can be adjusted to cause the laser beam 170 moving relative to the drawn carbon nanotube film 120, so that the laser spot 180 can be projected on the selected portions of the drawn carbon nanotube film 120.

If the relative velocity between the drawn carbon nanotube film 120 and the laser beam 170 is large enough, a number of pulse laser beams 170 generated by the laser device 160 can irradiate spaced portions of the drawn carbon nanotube film 120. Then, a number of spaced thin regions 126 shown in FIG. 1 and FIG. 3 can be formed. If the relative velocity between the drawn carbon nanotube film 120 and the laser beam 170 is smaller than the product of the diameter of the laser spot 180 and the pulse rate of the laser beam 170, then portions of the drawn carbon nanotube film 120 irradiated by a number of pulse laser beams 170 can connect or overlap with each other. As a result, the thin regions 226 shown in FIG. 4 and the thin regions 326 shown in FIG. 5 can be formed.

Further, during the process of forming a number of rows 124, the drawn carbon nanotube film 120 can be moved relative to the laser beam 170 along the second direction Y after one row 124 has been formed. Then another row 124 can then be formed in the manner described above. Alternatively, after one row 124 has been formed, the laser beam 170 can be moved relative to the drawn carbon nanotube film 120 along the second direction Y. Then, another row 124 can then be formed in the manner described above. In one embodiment shown in FIG. 11, a path 190 of the laser spot 180 on the drawn carbon nanotube film 120 can be a snake-shaped path.

Step (b) can be carried out in the environment with oxygen, for example, in the air, so that some carbon nanotubes in the irradiated portions absorb the laser beam energy, to react with the oxygen in the air and then decompose. Thus, some carbon nanotubes in the irradiated portions will be removed. In this process, large-diameter carbon nanotube segments in the irradiated portions tend to absorb more heat and burn out. As a result, the density of the irradiated portions is reduced and the thin regions 126/226/326 are formed.

Further, if the drawn carbon nanotube film 120 is suspended in the air by frames or supports or other structures during the process of forming the thin regions 126/226/326, the method can further include a step (c) of disposing the drawn carbon nanotube film 120 having the thin regions 126/226/326 on a surface of the substrate 140 after the step (b). The drawn carbon nanotube film 120 having the thin regions 126/226/326 can be adhered to the surface of the substrate 140 directly via its stickiness. Alternatively, a layer of adhesives 130 can be coated on one surface of the substrate 140 to secure the drawn carbon nanotube film 120 having the thin regions 126/226/326 on the substrate 140.

Alternatively, a solution of insulating polymer material can be first coated on one surface of the substrate 140, the drawn carbon nanotube film 120 having the thin regions 126/226/326 is then disposed on the surface of the substrate 140. Then, the solution of insulating polymer material will permeate into the drawn carbon nanotube film 120 having the thin regions 126/226/326. Finally, the insulating polymer material can be solidified and combined with the drawn carbon nanotube film 120 having the thin regions 126/226/326 to form a composite carbon nanotube film. The solidified insulating polymer material can also function as the adhesives 130 to secure the drawn carbon nanotube film 120 having the thin regions 126/226/326 on the substrate 140.

According to the above descriptions, because the thin regions have a density less than that of the normal region, the light transmittance of the thin regions can be about 10% to 20% greater than that of the normal region. In one embodiment, the light transmittance of the thin regions can be increased from about 75% to more than 85% after being treated by the laser beam 170. Thus, the light transmittance of the whole variable-density carbon nanotube film can be improved.

In order to illustrate the advantage of the variable-density carbon nanotube film 100, two tests have been run on some embodiments. In the two tests, the laser beam 170 has a power of approximately 3.6 watts. The pulse rate of the laser beam 170 is about 100 kHz. Both of the length and the width of the drawn carbon nanotube film 120 are about 30 millimeters. Other parameters and results of the tests are detailed in table 1 below:

TABLE 1

| Plot | Relative velocity between the drawn carbon nanotube film and the laser beam | Distance $d_2$ | Square resistance in the first direction X | Square resistance in the second direction Y | Light transmittance of the carbon nanotube film having thin regions |
|---|---|---|---|---|---|
| 1 | 2000 mm/s | 0.04 mm | 3 kΩ | 270 kΩ | 85% |
| 2 | 500 mm/s | 0.08 mm | 1.9 kΩ | 560 kΩ | 95% |

It is clear from the table 1 that the light transmittance of the drawn carbon nanotube film having thin regions can reach to about 85% to about 95%, and the square resistance of the variable-density carbon nanotube film 100 in the first direction X is much less than that in the second direction Y.

In some embodiments, step (b) and step (a) can be synchronously carried out by using a laser beam to irradiate a drawn carbon nanotube film at the time the drawn carbon nanotube film is drawn out.

It is to be understood that the above-described embodiments are intended to illustrate rather than limit the disclosure. Variations may be made to the embodiments without departing from the spirit of the disclosure as claimed. It is understood that any element of any one embodiment is considered to be disclosed to be incorporated with any other embodiment. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A variable-density carbon nanotube film comprising:
    a plurality of round thin regions; and
    at least one normal region comprising a plurality of carbon nanotubes substantially aligned along an aligned direction;
    wherein the at least one normal region has a first carbon nanotube density, and the plurality of round thin regions has a second carbon nanotube density; and the second carbon nanotube density in each of the plurality of round thin regions ranges from about 50% to about 80% of the first carbon nanotube density, and the plurality of round thin regions are arranged along the aligned direction.

2. The variable-density carbon nanotube film of claim 1, wherein the at least one normal region separates the plurality of round thin regions from each other.

3. The variable-density carbon nanotube film of claim 1, wherein the plurality of round thin regions form a plurality of rows extending along the aligned direction, and the plurality of rows are spaced from each other in a direction perpendicular to the aligned direction.

4. The variable-density carbon nanotube film of claim 3, wherein the plurality of round thin regions forms an array.

5. The variable-density carbon nanotube film of claim 3, wherein the plurality of round thin regions of adjacent rows are in a staggered formation.

6. The variable-density carbon nanotube film of claim 1, wherein a distance between two adjacent round thin regions is less than 100 micrometers.

7. A variable-density carbon nanotube film comprising:
a plurality of thin regions; and
at least one normal region comprising a plurality of carbon nanotubes joined end-to-end and substantially aligned along an aligned direction;
wherein the plurality of thin regions has a second carbon nanotube density, and the second carbon nanotube density of each of the plurality of thin regions ranges from about 50% to about 80% of a first carbon nanotube density of the at least one normal region; and the plurality of thin regions are round, and the plurality of thin regions are define an array.

8. The variable-density carbon nanotube film of claim 7, wherein a distance between two adjacent thin regions is less than 100 micrometers.

9. The variable-density carbon nanotube film of claim 7, wherein the plurality of thin regions form a plurality of rows extending along the aligned direction, and the plurality of rows are spaced from each other in a direction perpendicular to the aligned direction.

10. The variable-density carbon nanotube film of claim 9, wherein the plurality of thin regions of adjacent rows are in a staggered formation.

* * * * *